US012560978B2

(12) United States Patent
Bitz et al.

(10) Patent No.: US 12,560,978 B2
(45) Date of Patent: Feb. 24, 2026

(54) LOW PROFILE DEVICE HINGE ASSEMBLY

(71) Applicant: Microsoft Technology Licensing, LLC, Redmond, WA (US)

(72) Inventors: Brian Bitz, Woodinville, WA (US); Jordan David Little, Monroe, WA (US); Beau Tomas Squire, Sultan, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 18/131,816

(22) Filed: Apr. 6, 2023

(65) Prior Publication Data

US 2024/0338057 A1 Oct. 10, 2024

(51) Int. Cl.
*G06F 1/16* (2006.01)

(52) U.S. Cl.
CPC .......... *G06F 1/1681* (2013.01); *G06F 1/1626* (2013.01)

(58) Field of Classification Search
CPC .............................. G06F 1/1681; G06F 1/1626
See application file for complete search history.

(56) References Cited

U.S. PATENT DOCUMENTS

| | | | | | |
|---|---|---|---|---|---|
| 9,404,298 | B1 * | 8/2016 | Chen | ..................... | G06F 1/1681 |
| 9,518,414 | B1 * | 12/2016 | Chen | ..................... | G06F 1/1681 |
| 9,541,963 | B2 * | 1/2017 | Lin | ........................... | E05D 3/06 |
| 9,879,715 | B1 * | 1/2018 | Hsu | ......................... | E05D 11/00 |
| 10,001,162 | B2 * | 6/2018 | Hsu | ......................... | H04M 1/00 |
| 10,001,815 | B1 * | 6/2018 | Yao | ....................... | H05K 5/0234 |
| 10,028,398 | B1 * | 7/2018 | Lin | ........................ | E05D 11/06 |
| 10,037,057 | B2 * | 7/2018 | Schafer | .............. | H04M 1/0216 |
| 10,228,732 | B2 * | 3/2019 | Tomky | ................... | G06F 1/166 |
| 10,725,505 | B1 * | 7/2020 | Hallar | ................... | G06F 1/1662 |
| 10,852,776 | B1 * | 12/2020 | Morrison | .............. | G06F 1/1681 |
| 10,876,337 | B2 * | 12/2020 | Lin | ........................ | E05D 15/06 |
| 11,061,444 | B2 * | 7/2021 | Nakamura | .............. | G06F 1/162 |
| 2016/0320811 | A1 * | 11/2016 | Lin | ....................... | G06F 1/1681 |
| 2018/0049336 | A1 | 2/2018 | Manuel et al. | | |
| 2018/0081404 | A1 * | 3/2018 | Schafer | ............... | F16M 13/005 |
| 2018/0087563 | A1 * | 3/2018 | Hsu | ......................... | H04M 1/00 |
| 2018/0335808 | A1 * | 11/2018 | Tomky | ................. | G06F 1/1626 |
| 2018/0363341 | A1 | 12/2018 | Siddiqui et al. | | |
| 2019/0169904 | A1 | 6/2019 | Hu et al. | | |
| 2020/0080357 | A1 * | 3/2020 | Lin | ....................... | G06F 1/1681 |
| 2020/0241604 | A1 * | 7/2020 | Nakamura | ........... | G06F 1/1618 |

FOREIGN PATENT DOCUMENTS

KR 20130104523 A 9/2013

* cited by examiner

*Primary Examiner* — Imani N Hayman
*Assistant Examiner* — Theron S Milliser
(74) *Attorney, Agent, or Firm* — Rainier Patents, P.S.

(57) ABSTRACT

The description relates to hinged devices, such as hinged computing devices. One example can include a first portion and a second portion coupled by a hinge assembly through a range of orientations. The hinge assembly includes a double slider assembly positioned on the first portion and secured to a pivot assembly with which the second portion is configured to both rotate and translate to define a virtual pivot of the second portion through the range of orientations.

20 Claims, 6 Drawing Sheets

FIRST PORTION
102

DEVICE 100

TABLET 112

HINGE FRAME 108(2)

HINGE ASSEMBLY 106(2)

HINGE ARM 110(2)

HINGE FRAME 108(1)

HINGE ARM 110(1)

HINGE ASSEMBLY 106(1)

SECOND PORTION 104

ELECTRONIC COMPONENTS 122

DISPLAY 118

KICKSTAND 114

HOUSING 120

116

DEVICE 100

DEVICE 100

DEVICE 100

LOW PROFILE DEVICE HINGE ASSEMBLY

BACKGROUND

Low profile hinges have been developed to address low profile hinge scenarios, such as connecting a kickstand to a device.

SUMMARY

This patent relates to hinged devices, such as hinged computing devices. One example can include a first portion and a second portion coupled by a hinge assembly through a range of orientations. The hinge assembly includes a double slider assembly positioned on the first portion and secured to a pivot assembly with which the second portion is configured to both rotate and translate to define a virtual pivot of the second portion through the range of orientations.

This summary is intended to provide a brief introduction to some of the concepts contained in this patent and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing hinge assemblies that can secure first and second device portions. Consumers tend to favor thin devices, such as laptops, tablets, and smart phones. However, consumers do not want to sacrifice functionality to achieve thinness. The hinge assemblies can satisfy the consumers' desire for thinness while satisfying other design parameters, such as ease of opening and closing and the ability to open through a wide range of orientations, such as zero degrees through 180 degrees. These and other aspects are described below.

Figure 1:
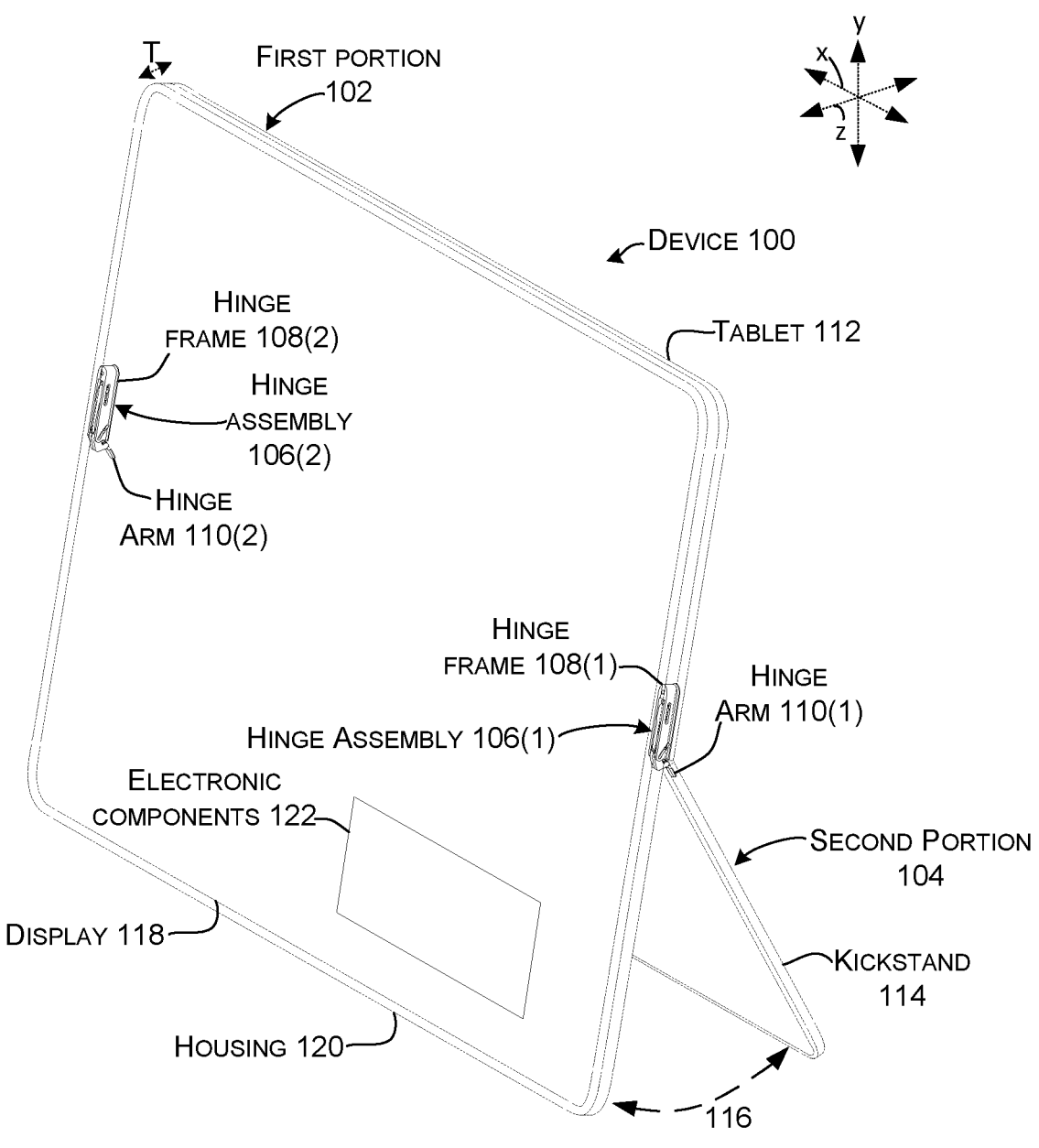
FIGS. 1 and 5A-5C show perspective views of example devices in accordance with some implementations of the present concepts.

Introductory FIG. 1 shows an example device 100 that has first and second portions 102 and 104 that are secured together by a hinge assembly 106. In this case, two hinge assemblies 106(1) and 106(2) can operate cooperatively to secure the first and second portions. Other implementations can use a single hinge assembly or more than two hinge assemblies. In the illustrated configuration, the hinge assemblies 106 include hinge frames 108 and a hinge arm 110. The hinge assemblies 106 can be secured to the first portion 102 via the hinge frames 108. The hinge assemblies 106 can be secured to the second portion 104 via the hinge arms 110.

In the illustrated configuration, the first portion 102 is manifest as a tablet 112 (e.g., tablet-type computing device) and the second portion 104 is manifest as a kickstand 114 for the tablet 112. The kickstand is illustrated rotated at the hinge assemblies 106 to an open orientation of about 40°. The hinge assemblies 106 can allow the kickstand to be rotated through a range of orientations 116 that includes a closed position against the tablet 112 (zero degrees) and other open angles to a fully open angle of about 180 degrees, for example.

Beyond the illustrated tablet configuration, in other implementations, the first and second portions 102 and 104 can be manifest as other form factors. For instance, the first and second portions could be manifest as the input side and display side of a notebook computing device. In another example, the first and second portions could be manifest as two sides of a foldable smart phone or a wearable smart device. In one such example, either or both of the first and second portions can include a display 118 and/or multiple displays positioned relative to a housing 120 that includes electronic components 122. In FIG. 1, the display 118 and housing 120 are shown in ghost to allow the hinge assemblies 106, hinge frames 108, hinge arms 110 and the electronic components 122, which would be obscured, to be visualized.

Tablet 112 provides an example of a device that is space-constrained in at least one direction. In the case of tablets, notebooks, and/or smart phones, the market prefers ever thinner devices as represented by thickness T (e.g., parallel to the z-reference direction). Hinge assemblies 106 include features that lend themselves to space constrained applications. Some of these features are illustrated below relative to FIGS. 2A-6C.

Figure 2A:
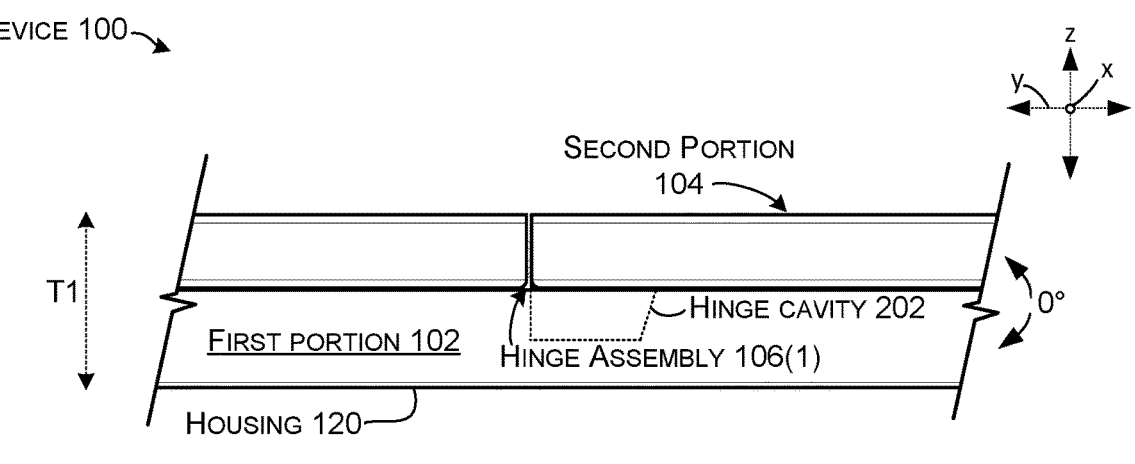
FIGS. 2A-2C show elevational views of example devices in accordance with some implementations of the present concepts.
Figure 2B:
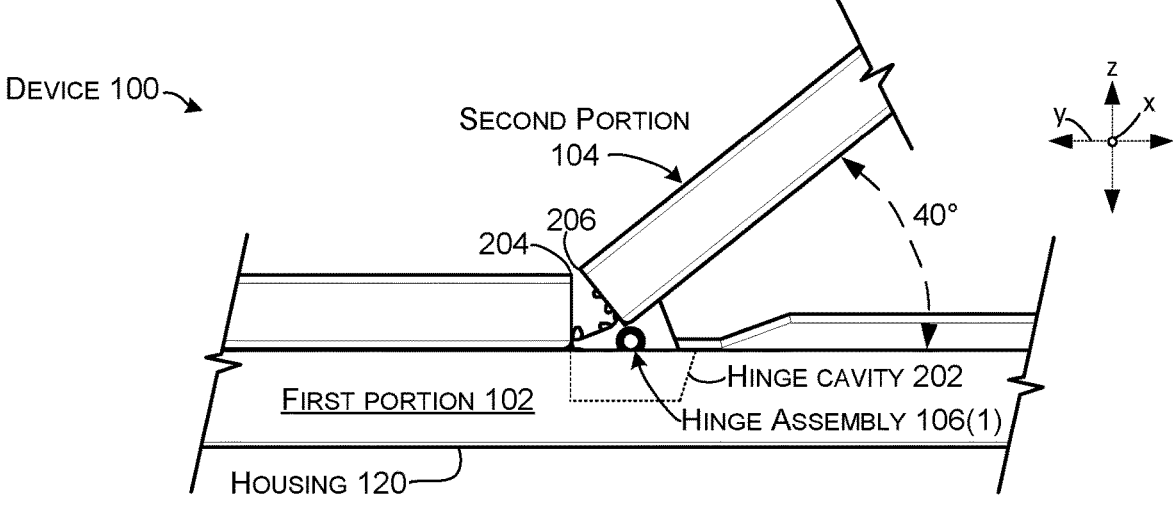
Figure 2C:
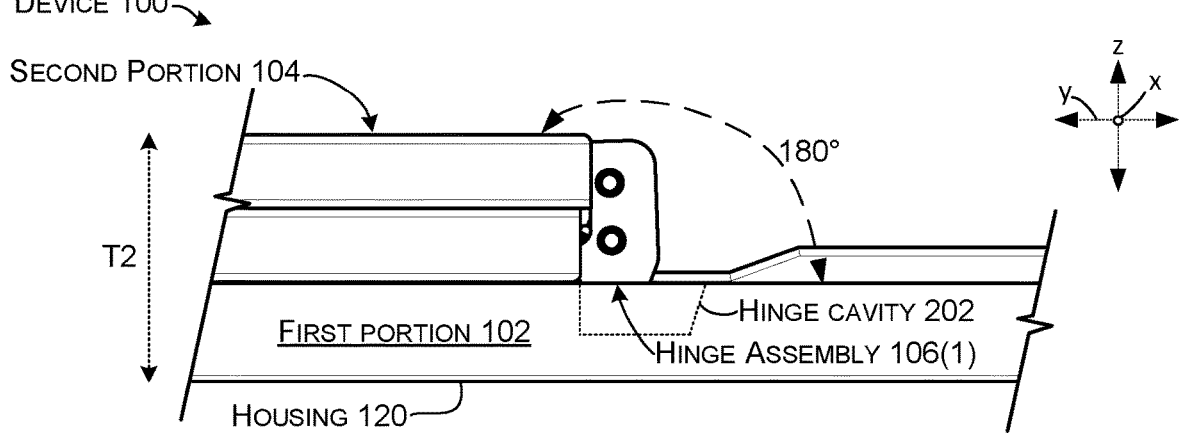

FIGS. 2A-2C collectively show side elevational views of device 100 at a range of orientations from zero degrees to 180 degrees enabled by hinge assembly 106(1). FIG. 2A shows device 100 in the closed or zero-degree orientation where the second portion 104 is closed against the first portion 102. FIG. 2B shows device 100 at an approximately 40-degree orientation between the second portion 104 and the first portion 102. FIG. 2C shows device 100 in the fully open or 180-degree orientation between the second portion 104 and the first portion 102. FIGS. 2A-2C also show hinge cavities 202 formed in the housing 120, which receive portions of the hinge assemblies 106(1) in the zero-degree orientation and the partially open 40-degree orientation. The hinge cavities 202 are shown in ghost to indicate that they would not be visible in these views.

The hinge assembly 106(1) provides a complex trajectory (e.g., a virtual pivot) of the second portion 104 through the range of orientations. This virtual pivot provides a technical solution that allows the second portion to abut the first portion with little or no gap in the closed orientation of FIG. 2A. Further, as shown in FIG. 2B the virtual pivot avoids contact between the inside corners 204 and 206 of the first and second portions, which could potentially damage the device, such as displays, during intermediary angles. The virtual pivot further allows the second portion to lay against, and generally parallel to, the first portion in the fully open or 180-degree orientation, such as within +/−2 degrees.

Note further that the virtual pivot is achieved without the hinge assembly 106(1) extending above the second portion 104 at any point during the range of rotation. Stated another way, throughout rotation the hinge assembly 106(1) is contained within a thickness defined by the first and second portions. In the zero-degree orientation of FIG. 2A, the hinge assembly 106(1) is equal to or contained with thickness T1. The hinge assembly 106(1) does not extend above upper surfaces of the first and second portions 102 and 104. During rotation, the thickness changes with the rotation of the second portion 104 and the hinge assembly 106(1) remains below the upper surfaces of the first and second portions. At the 180-degree orientation of FIG. 2C, the thickness T2 reflects the second portion 104 positioned over the first portion and the hinge assembly 106(1) is contained within the thickness. The virtual pivot is described in more detail below relative to FIGS. 4A-6C.

Figure 3:
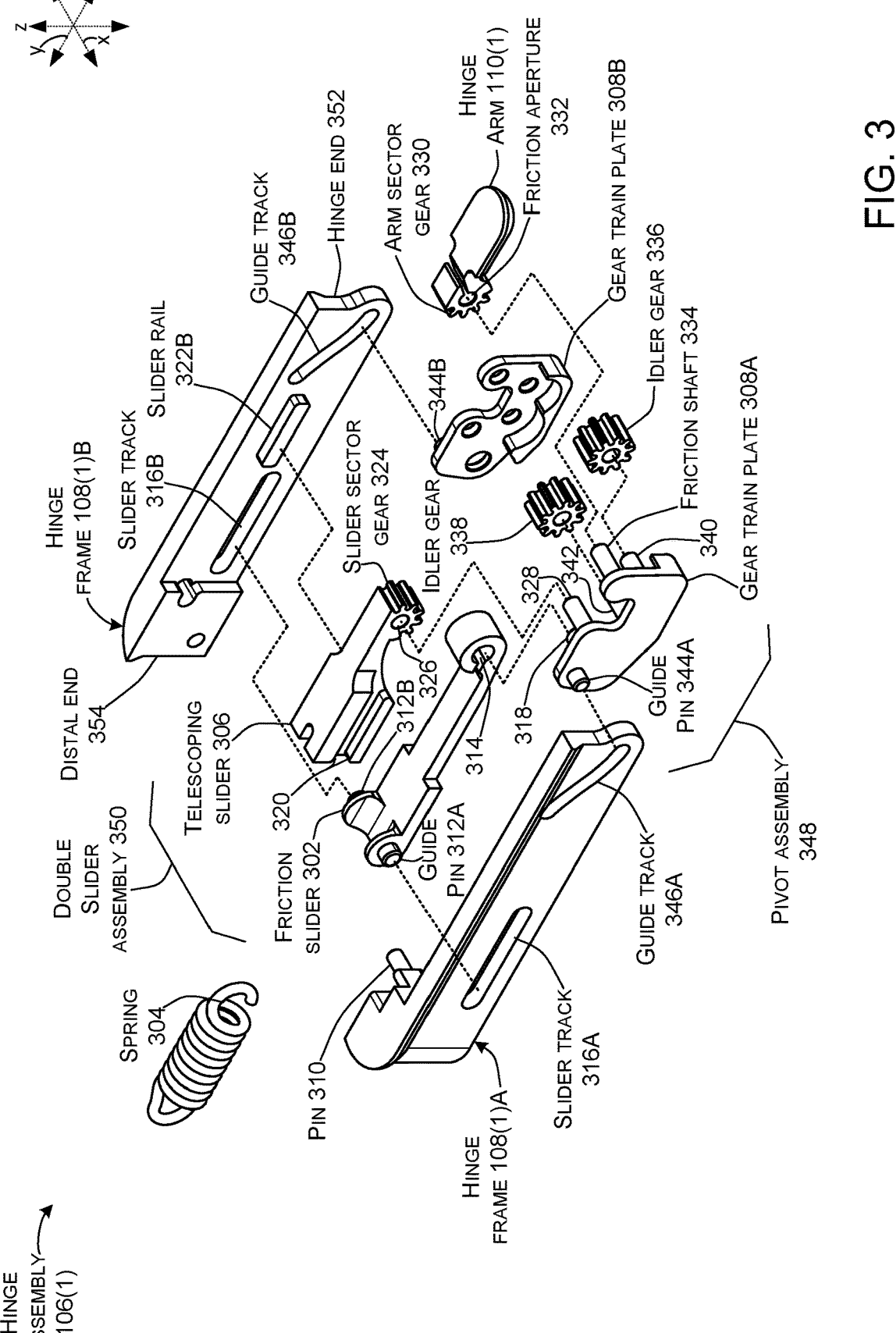
FIGS. 3 and 4A-4C show exploded perspective views of example devices in accordance with some implementations of the present concepts.

FIG. 3 shows details of example hinge assembly 106(1). The hinge assembly includes hinge frame 108(1) and hinge arm 110(1) introduced above. The hinge frame 108(1) is manifest as complementary interlocking spaced-apart hinge frames 108(1)A and 108(1)B. The hinge assembly 106(1) also includes friction slider 302, spring 304, telescoping slider 306, and a pair of complementary spaced-apart gear train plates 308.

The spring 304 extends between a pin 310 and the telescoping slider 306. The pin 310 extends between and couples the hinge frames 108(1)A and 108(1)B. The friction slider 302 defines guide pins 312 and a friction aperture 314. The guide pins 312 are positioned in slider tracks 316 defined by hinge frames 108(1)A and 108(1)B. The slider tracks 316 provide a technical solution by defining the range and direction of movement of the friction slider 302 so that the friction slider is slideably retained between the hinge frames 108(1). The friction aperture 314 is positioned on a friction shaft 318 defined by gear train plate 308A. The friction shaft 318 also extends through the friction aperture 314 into a receptacle defined by gear train plate 308B. This receptacle is shown but not designated to reduce clutter on the drawing page.

The telescoping slider 306 defines opposing pairs of bumpers 320 and the hinge frames 108(1)A and 108(1)B define slider rails 322. One pair of bumpers 320 facing toward the reader is visible. The opposite pair of bumpers facing away from the reader is not visible. Similarly, slider rail 322B on frame 108(1)B is facing toward the reader and is visible. The other slider rail 322A on frame 108(1)A is facing away from the reader and is not visible. The slider rails 322 are positioned between the pairs of bumpers 320. The interaction of the slider rails 322 between the pairs of bumpers 320 provides a technical solution that constrains the direction of movement of the telescoping slider 306 and slideably retains the telescoping slider 306 between the hinge frames 108(1). In this example, the telescoping slider 306 can only move along the y reference axis. The telescoping slider 306 also includes a slider sector gear 324 at the opposite end from the spring 304. An aperture 326 in the slider sector gear is positioned on a shaft 328 defined by gear train plate 308A.

Hinge arm 110(1) defines an arm sector gear 330 and a friction aperture 332. The friction aperture 332 fits on a friction shaft 334 defined by the gear train plate 308A. Idler gears 336 and 338 include apertures and are positioned on shafts 340 and 342 defined by gear train plate 308A. Taken collectively, the gear train plates 308 provide a technical solution that causes the slider sector gear 324 to engage idler gear 338, which in turn engages idler gear 336, which in turn engages arm sector gear 330 (e.g., these gears function as a gear train that couples and synchronizes rotation of the first and second portions). The gear train plates 308 also define guide pins 344 that ride in guide tracks 346 defined by the hinge frames 108(1)A and 108(1)B. The gear train plates 308, slider sector gear 324, idler gears 336 and 338, and hinge arm 110(1) with its arm sector gear 330 can be grouped as a pivot assembly 348. The pivot assembly 348 provides a technical solution entailing the virtual pivot of the second portion. Similarly, the friction slider 302 and the telescoping slider 306 can contribute to a double slider assembly 350. The double slider assembly 350 provides a technical solution defining the linear position and orientational rotation of the pivot assembly 348. For purposes of explanation, the hinge frames 108(1) may be referred to as extending from a hinge end 352 to a distal end 354. The linear movement of the double slider assembly 350 is generally between the hinge end 352 to a distal end 354 in the y reference direction. These aspects are explained in more detail below relative to FIGS. 4A-6C.

Figures 4A, 4B, 4C:
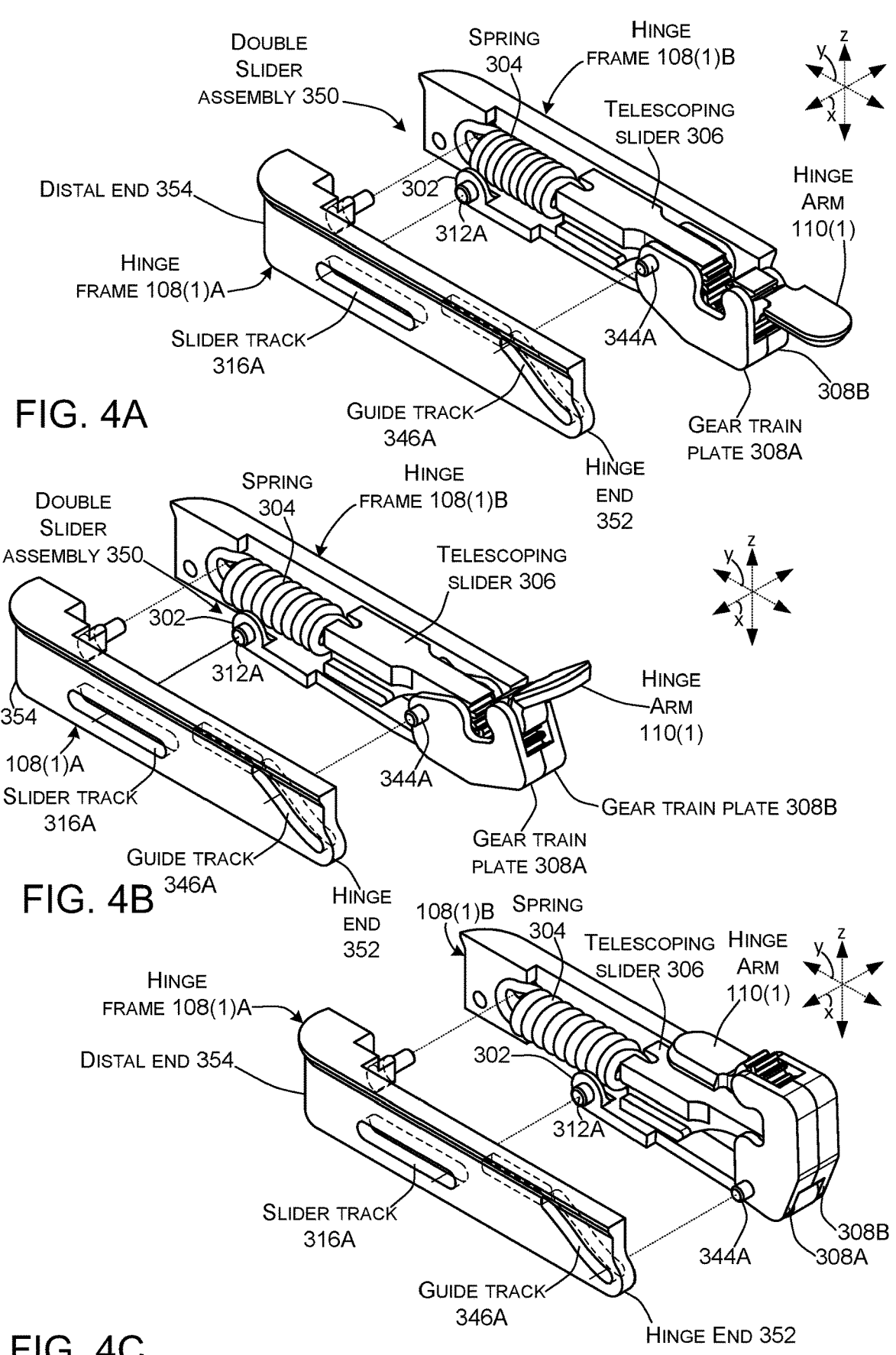
Figures 5A, 5B, 5C:
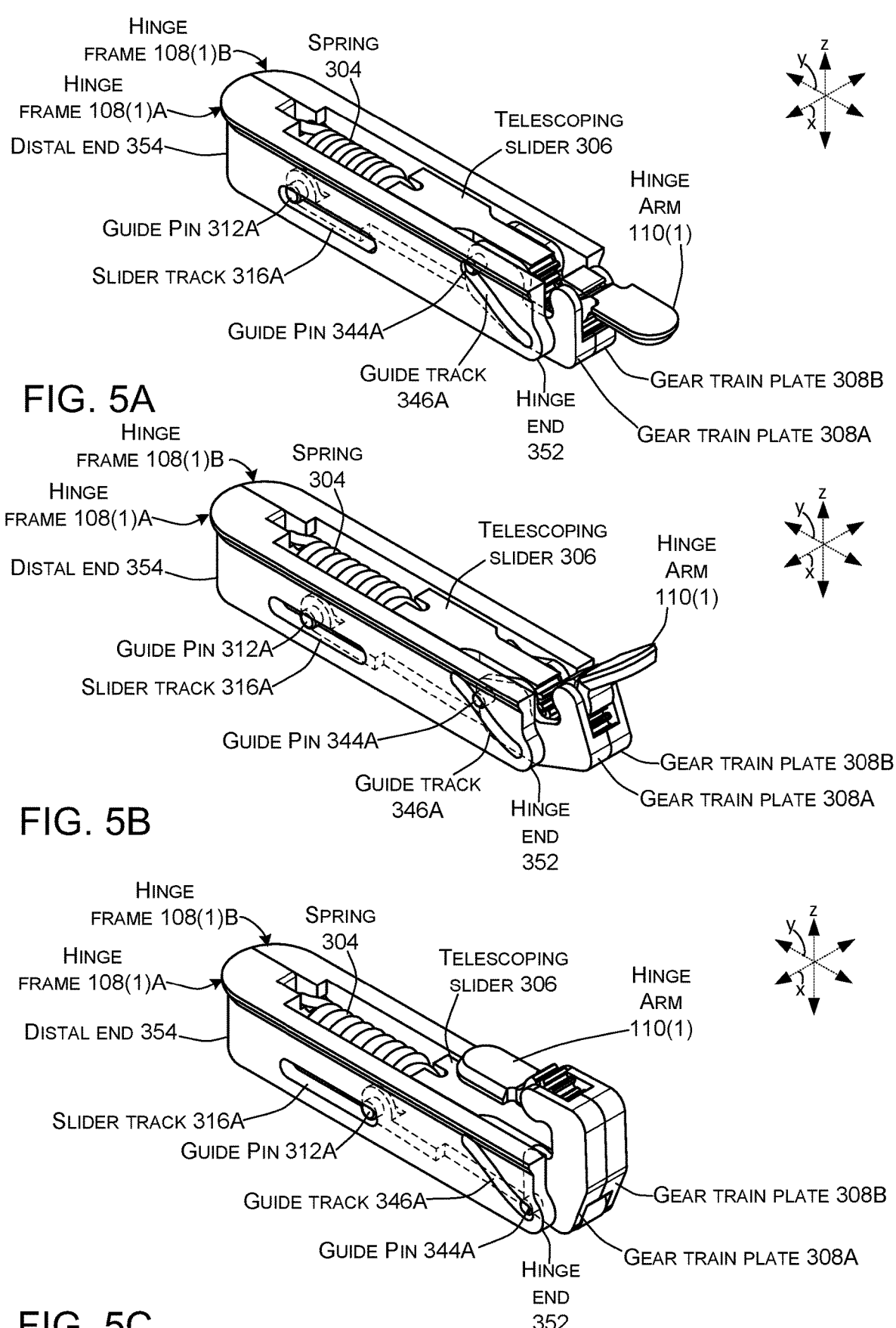
Figures 6A, 6B, 6C:
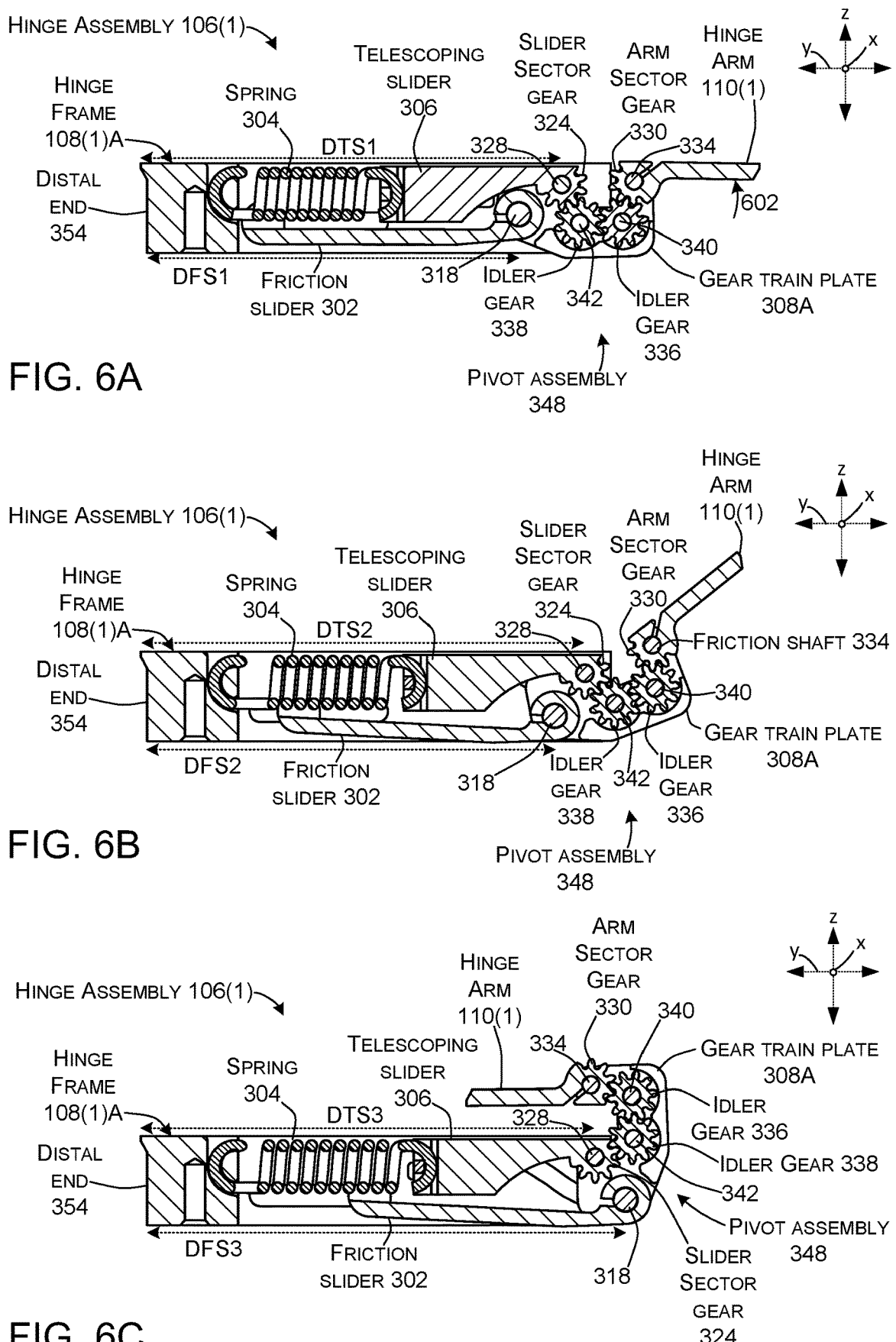
FIGS. 6A-6C show sectional views of example devices in accordance with some implementations of the present concepts.

FIGS. 4A-4C, 5A-5C, and 6A-6C collectively show the function of the hinge assembly components introduced in FIG. 3. FIGS. 4A, 5A, and 6A show the hinge assembly 106(1) at the closed or zero-degree orientation of FIG. 2A. FIGS. 4B, 5B, and 6B show the hinge assembly 106(1) at the partially open 40-degree orientation of FIG. 2B. FIGS. 4C, 5C, and 6C show the hinge assembly 106(1) at the 180-degree orientation of FIG. 2C. FIGS. 4A-4C are partially assembled perspective views. FIGS. 5A-5C are corresponding fully assembled perspective views. FIGS. 6A-6C are corresponding sectional views.

Looking at the zero-degree orientation of FIGS. 4A, 5A, and 6A, the double slider assembly 350 is positioned fully to the left in the negative y reference direction toward the distal end 354. The spring 304 has pulled the telescoping slider 306 to the left and the spring is approaching a relaxed (e.g., non-stretched state). This aspect is also reflected on FIG. 6A as telescoping slider dimension DTS1 that extends from the distal end 354 to the center of shaft 328. The guide pins 312 of the friction slider 302 are at the left end of the slider tracks 316. This aspect is also reflected on FIG. 6A as friction slider dimension DFS1 that extends from the distal end 354 to the center of shaft 318.

The guide pins 344 of the gear train plates 308 are positioned at the upper left end of the guide tracks 346. The gear train plates 308 are rotated between the hinge frames 108(1)A and 108(1)B with the guide pins 344 oriented at the 9 o'clock position and at the upper and distal end of guide tracks 346. This allows a majority of the gear train plates 308 as well as the slider sector gear 324 and idler gear 338 to be positioned between the hinge frames 108(1).

From the closed position, rotation of the hinge arm 110(1) begins with a counterclockwise force applied to the hinge arm as represented by arrow 602 in FIG. 6A. This force imparts a torque on the pivot assembly 348 via the arm sector gear 330. The resultant virtual pivot of the hinge arm 110(1) is described below relative to FIGS. 4B, 5B, and 6B. Note that the resultant virtual pivot of the hinge arm 110(1) is a complex rotation in that the rotation is defined in part by the gear train plates 308, which both translate and rotate during the rotation of the hinge arm 110(1).

Further, the gear train plates 308 define shafts 318, 328, 334, 340, and 342. Gear rotation occurs around these shafts concurrently with the rotation of the gear train plates. As mentioned above, during this rotation the pivot assembly 348 including the gear train plates 308 is configured to translate with the telescoping slider 306 and the friction slider 302. Further, rotation around shafts 328, 342, 340, and 334 are synchronized by the slider sector gear 324, idler gear 338, idler gear 336, and arm sector gear 330. This complex rotation and translation associated with the pivot assembly 348 can provide the virtual pivot of the hinge arm 110(1) and hence the second portion. No single figure shows all of these aspects. Generally, FIGS. 4A-4C and 5A-5C show the translation and rotation of the gear train plates 308 and FIGS. 6A-6C show the rotation around the shafts 318, 328, 334, 340, and 342.

Looking at FIGS. 4B and 5B, the rotation of the hinge arm 110(1) creates (counterclockwise) torque on the pivot assembly 348. However, rotation of the pivot assembly is constrained by the guide pins 344 in the guide tracks 346. Thus, for the torque to rotate the gear train plates 308, the guide pins 344 have to move along the guide tracks 346 in the z direction and the y direction. The y direction movement causes the pivot assembly 348 to move away from the distal end 354. This movement pulls the telescoping slider towards the hinge end 352 and stretches the spring 304. This aspect is also evidenced by comparing the larger DTS2 of FIG. 6B to the smaller DTS1 of FIG. 6A. Similarly, the friction slider 302 is moved towards the hinge end as guide pins 312 move in slider tracks 316. This aspect is also evidenced by comparing the larger DFS2 of FIG. 6B to the smaller DFS1 of FIG. 6A. Thus, the guide pins 344 and the guide tracks 346 provide a technical solution that converts a rotational torque into both rotation of the pivot assembly 348 and lateral movement of the pivot assembly 348 (e.g., translation in the yz reference plane). Thus, during at least some orientations, the virtual pivot includes both a rotational component and a simultaneous translational component.

FIG. 6B shows how the idler gears 336 and 338 provide a technical solution of synchronized rotation around shafts 328 and 334. In comparison to FIG. 6A, hinge arm 110(1) has rotated approximately 20 degrees around friction shaft 334. This rotation is conveyed through idler gears 336 and 338 to slider sector gear 324 of the telescoping slider 306. The telescoping slider is prevented from rotating by the interaction of bumpers 320 and slider rails 322. Instead, the idler gear 338 and hence the gear train plates 308 rotate an equal and simultaneous 20 degrees. Thus, the hinge arm 110(1) has rotated a total of 40 degrees relative to FIG. 6A. As mentioned above, this rotation is complex in that part of the rotation entails or is contributed by the hinge arm 110(1) around the friction shaft 334. Another part of the rotation is contributed by the gear train plates 308, which define the friction shaft 334. Thus, note that the friction shaft 334 is not in the same location (has moved rotationally) in FIG. 6B compared to FIG. 6A.

FIGS. 4C and 5C show the continued rotation of the hinge arm 110(1) and the gear train plates 308 from the intermediate orientation of FIGS. 4B and 5B to the fully open orientation. The telescoping slider 306 has continued to move to the right and stretch the spring 304 to its fullest extent. This aspect is also evidenced by comparing the larger DTS3 of FIG. 6C to the smaller DTS2 of FIG. 6B.

Similarly, in the fully open orientation of FIGS. 4C, 5C, and 6C, friction slider 302 has moved fully to the right as reflected by guide pins 312 being in the right-most position in the slider tracks 316. This aspect is also evidenced by comparing the larger DFS3 of FIG. 6C to the smaller DFS2 of FIG. 6B. In contrast, the guide pins 312 are in an intermediate position in FIGS. 4B and 5B and at the left-most position in FIGS. 4A and 5A. In the fully open orientation, the gear plates 308 have continued to rotate counterclockwise along a path dictated by guide pins 344 in guide tracks 346. The guide pins 344 are now at the 6 o'clock position at the bottom right ends of the guide tracks 346. This has produced approximately 90 degrees of rotation of the gear train plates 308 (e.g., the guide pins 344 moved from the 9 o'clock position to the 6 o'clock position or 90 degrees).

FIG. 6C shows that arm sector gear 330 has now rotated a total of about 90 degrees on friction shaft 334 relative to FIG. 6A and about 70 degrees relative to FIG. 6B. However, because of the intermeshing of the arm sector gear 330 with idler gear 336, idler gear 336 with idler gear 338, and idler gear 338 with slider sector gear 324, the gear train plates 308 have simultaneously rotated 90 degrees. Recall that friction shaft 334 is defined by the gear train plates 308 and it has rotated 90 degrees with the gear train plates 308. Thus, the total rotation experienced by the hinge arm 110(1) is approximately 180 degrees compared to FIG. 6A and 140 degrees compared to FIG. 6B.

The hinge assembly 106(1) provides a technical solution that involves a virtual pivot of the hinge arm 110(1) (and thereby the second portion 104) around the hinge frames 108(1) (and thereby the first portion 102). This technical solution is achieved by interaction of the gear plates' guide pins 344 in the hinge frames' guide tracks 346. The friction slider 302 and the telescoping slider 306 constitute the double slider assembly 350. The friction slider 302 contributes pivot control to the pivot assembly 348. The friction slider 302 also provides friction (e.g., resistance to rotation) via the pivot assembly's friction shaft 318 positioned in the friction slider's friction aperture 314. The telescoping slider 306 allows lateral translation (e.g., linear movement) of the pivot assembly during rotation so that the inside corners of the first and second portions do not collide at intermediate orientations as explained above relative to FIGS. 2A-2C.

Note also that in this implementation, the slit configuration and directionality of friction apertures 314 and 332 contribute to asymmetric resistance to rotation. For instance, when the open orientation is increasing (e.g., rotating from closed to open) the resistance to rotation produced by the hinge assembly increases as fully opened is approached. However, if the direction of rotation is reversed (e.g., from open to closed) the initial resistance to rotation is low. For instance, looking at friction aperture 314 and friction shaft 318 when the direction of rotation is from closed to open, the friction between the friction shaft 318 and the friction aperture 314 essentially squeezes or slightly closes the friction aperture 314 and increases friction. In contrast, when the direction of rotation is reversed, the interaction of the friction shaft 318 in the friction aperture 314 functions to slightly open the friction aperture 314 and thus decreases friction.

Further, this configuration that includes a frictional element (e.g., friction shaft 318 in the friction aperture 314) between the hinge frames 108(1) and the gear train plates 308 and another friction element (e.g., friction shaft 334 in the friction aperture 332). This configuration provides a technical solution that decreases backlash in the hinge assembly 106(1). Reducing backlash contributes to the first and second portions staying at the orientation the user sets them. For instance, if the user fully opens the first and second portions, they stay fully open rather than rebounding back a few degrees.

Individual elements of the hinge assemblies 106 can be made from various materials, such as metals, plastics, foams, polymers, and/or composites. These materials can be prepared in various ways, such as in the form of sheet metals, die cast metals, machined metals, 3D printed materials, molded or 3D printed plastics, and/or molded or 3D printed composites, among others, or any combination of these (and/or other) materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-6C.

Various examples are described above. Additional examples are described below. One example includes a device comprising a first portion and a second portion coupled by a hinge assembly through a range of orientations and the hinge assembly comprising a double slider assembly positioned on the first portion and secured to a pivot assembly with which the second portion is configured to both rotate and translate to define a virtual pivot of the second portion through the range of orientations.

Another example can include any of the above and/or below examples where the double slider assembly comprises a telescoping slider and a friction slider that are arranged generally parallel to one another.

Another example can include any of the above and/or below examples where the hinge assembly comprises a pair of spaced apart hinge frames.

Another example can include any of the above and/or below examples where the telescoping slider and the friction slider are positioned between the pair of spaced apart hinge frames.

Another example can include any of the above and/or below examples where the pair of spaced apart hinge frames constrain rotation of the telescoping slider and/or the friction slider and allow linear movement of the telescoping slider and the friction slider.

Another example can include any of the above and/or below examples where the pair of spaced apart hinge frames define a path of the pivot assembly.

Another example can include any of the above and/or below examples where the pivot assembly comprises a pair of spaced apart gear train plates that define a shaft to which the second portion is attached.

Another example can include any of the above and/or below examples where the pair of spaced apart gear train plates define guide pins, and wherein movement of the guide pins in guide tracks in the pair of spaced apart hinge frames defines the path of the pivot assembly.

Another example can include any of the above and/or below examples where the path of the pivot assembly defines the virtual pivot of the second portion at the shaft.

Another example can include any of the above and/or below examples where the second portion is secured to an arm sector gear that rotates around the shaft.

Another example can include any of the above and/or below examples where the telescoping slider defines a slider sector gear.

Another example can include any of the above and/or below examples where rotation of the arm sector gear is synchronized to rotation around the slider sector gear.

Another example can include any of the above and/or below examples where the device further comprises first and second idler gears positioned between the pair of spaced apart gear train plates that synchronize the rotation of the arm sector gear to equal and simultaneous rotation around the slider sector gear.

Another example can include any of the above and/or below examples where the slider sector gear is constrained from rotation by the pair of hinge frames, and wherein the pivot assembly is configured to rotate around the slider sector gear during the range of orientations simultaneously to translation defined by the telescoping slider and/or the friction slider.

Another example includes a device comprising a first portion and a second portion coupled by a hinge assembly through a range of orientations and the hinge assembly comprising a pivot assembly that is slideably coupled to the first portion and non-slideably coupled to the second portion and that synchronizes rotation of the second portion to equal rotation relative to the first portion.

Another example can include any of the above and/or below examples where the hinge assembly comprises a telescoping slider that can move linearly toward and away from the pivot assembly but is constrained from rotating.

Another example can include any of the above and/or below examples where the telescoping slider defines a slider sector gear surrounding an aperture.

Another example can include any of the above and/or below examples where the pivot assembly defines a shaft upon which the aperture is positioned.

Another example includes a device comprising a first portion and a second portion coupled by a hinge assembly through a range of orientations and the hinge assembly comprising a double slider assembly that is configured to translate during the range of orientations and is slideably coupled to the first portion and non-slideably coupled to the second portion and that synchronizes rotation of the second portion to equal rotation relative to the first portion.

Another example can include any of the above and/or below examples where the device further comprises a pivot assembly that is coupled to the double slider assembly and that defines a gear train that couples rotation of the second portion around the pivot assembly to rotation of the pivot assembly around the double slider assembly.

The invention claimed is:

1. A device, comprising:
a first portion and a second portion coupled by a hinge assembly through a range of orientations; and,
the hinge assembly comprising a hinge frame extending along a plane and positioned in the first portion, the hinge assembly defining a first track and a second track within the plane and comprising a friction slider extending between a distal end configured to travel along the first track within the first portion and a proximal end and secured to a pivot assembly that is configured to travel along a trajectory defined by the second track that is not parallel with the first track, and the pivot assembly is configured to both rotate and translate to define a virtual pivot of the second portion through the range of orientations.

2. The device of claim 1, wherein the hinge assembly further comprises a telescoping slider that is arranged generally parallel to the friction slider.

3. The device of claim 2, wherein the hinge frame comprises a pair of spaced apart hinge frames.

4. The device of claim 3, wherein the telescoping slider and the friction slider are positioned between the pair of spaced apart hinge frames.

5. The device of claim 4, wherein the pair of spaced apart hinge frames constrain rotation of the telescoping slider and/or the friction slider and allow linear movement of the telescoping slider and the friction slider.

6. The device of claim 5, wherein the pair of spaced apart hinge frames define a path of the pivot assembly.

7. The device of claim 6, wherein the pivot assembly comprises a pair of spaced apart gear train plates that define a shaft to which the second portion is attached.

8. The device of claim 7, wherein the pair of spaced apart gear train plates define guide pins, and wherein movement of the guide pins in the second track in the pair of spaced apart hinge frames defines the path of the pivot assembly.

9. The device of claim 8, wherein the path of the pivot assembly defines the virtual pivot of the second portion at the shaft.

10. The device of claim 9, wherein the second portion is secured to an arm sector gear that rotates around the shaft.

11. The device of claim 10, wherein the telescoping slider defines a slider sector gear.

12. The device of claim 11, wherein rotation of the arm sector gear is synchronized to rotation around the slider sector gear.

13. The device of claim 12, further comprising first and second idler gears positioned between the pair of spaced apart gear train plates that synchronize the rotation of the arm sector gear to equal and simultaneous rotation around the slider sector gear.

14. The device of claim 13, wherein the slider sector gear is constrained from rotation by the pair of hinge frames, and wherein the pair of spaced apart gear train plates are configured to rotate around the slider sector gear during the range of orientations simultaneously to translation defined by the telescoping slider and/or the friction slider.

15. A device, comprising:

a first portion and a second portion coupled by a hinge assembly through a range of orientations; and, the hinge assembly comprising a hinge frame that defines a first non-parallel track and a second non-parallel track and a pivot assembly that is non-slideably coupled to the second portion and that is slideably coupled to the first portion by a friction slider having a first end that moves relative to the first track and a second end that moves with the pivot assembly relative to the second track.

16. The device of claim 15, wherein the hinge assembly comprises a telescoping slider that is stacked above the friction slider and that can move linearly toward and away from the pivot assembly but is constrained from rotating.

17. The device of claim 16, wherein the telescoping slider defines a slider sector gear surrounding an aperture.

18. The device of claim 17, wherein the pivot assembly defines a shaft upon which the aperture is positioned.

19. A device, comprising:

a first portion and a second portion coupled by a hinge assembly through a range of orientations; and, the hinge assembly comprising a double slider assembly comprising a stacked friction slider and a telescoping slider and that is configured to translate during the range of orientations and is slideably coupled to the first portion along a guide track that is not parallel to a display surface of the first portion and non-slideably coupled to the second portion and that synchronizes rotation of the second portion to equal rotation relative to the first portion.

20. The device of claim 19, further comprising a pivot assembly that is coupled to the double slider assembly and that defines a gear train that couples rotation of the second portion around the pivot assembly to rotation of the pivot assembly around the double slider assembly.

* * * * *